United States Patent [19]
Evans et al.

[11] Patent Number: 5,739,906
[45] Date of Patent: Apr. 14, 1998

[54] INTERFEROMETRIC THICKNESS VARIATION TEST METHOD FOR WINDOWS AND SILICON WAFERS USING A DIVERGING WAVEFRONT

[75] Inventors: Christopher James Evans, Gaithersburg, Md.; Robert Edson Parks, Tucson, Ariz.

[73] Assignee: The United States of America as represented by the Secretary of Commerce, Washington, D.C.

[21] Appl. No.: 663,021

[22] Filed: Jun. 7, 1996

[51] Int. Cl.⁶ .................................................. G01B 9/02
[52] U.S. Cl. .......................................... 356/357; 356/360
[58] Field of Search .................................. 356/355, 357, 356/359, 360

[56] References Cited

U.S. PATENT DOCUMENTS

| | | |
|---|---|---|
| 4,893,024 | 1/1990 | Koashi . |
| 5,129,724 | 7/1992 | Brophy . |
| 5,159,408 | 10/1992 | Waldenmaier . |
| 5,232,547 | 8/1993 | Drowley . |
| 5,291,269 | 3/1994 | Ledger . |
| 5,337,150 | 8/1994 | Mumola . |
| 5,349,440 | 9/1994 | DeGroot . |
| 5,355,217 | 10/1994 | Canteloup . |
| 5,402,234 | 3/1995 | Deck . |
| 5,418,612 | 5/1995 | Khopov . |
| 5,465,154 | 11/1995 | Levy . |
| 5,502,564 | 3/1996 | Ledger . |

FOREIGN PATENT DOCUMENTS

| | | |
|---|---|---|
| 3931213 | 4/1991 | Germany . |
| 1404810 | 6/1988 | U.S.S.R. ............... 356/360 |

*Primary Examiner*—Samuel A. Turner
*Attorney, Agent, or Firm*—Watson Cole Stevens Davis

[57] ABSTRACT

An interferometric apparatus and method are provided for determining a central thickness and thickness variations of silicon wafers and other window-like optics. The method includes the steps of (1) emitting a beam of electromagnetic radiation having a diverging wavefront, at an object which is transparent to the radiation, (2) splitting the beam into a reference beam and a test beam, (3) positioning the object in a first position in the test beam to irradiate a central portion of the object, (4) directing the test beam through the central portion, (5) causing the reference beam to interfere with the test beam which has passed through the central portion to form a first interferometric fringe pattern, (6) changing the length of the test beam which has passed through the object until the first interferometric pattern is changed into a desired second interferometric fringe pattern, (7) determining a central thickness of the object in accordance with an amount by which the length of the test beam was changed, (8) moving the object in said test beam to a location in the test beam to irradiate a second portion of the object which is larger than the central portion, (9) causing the reference beam to interfere with the test beam which has passed through the second portion to form a third interferometric fringe pattern, and (10) determining variations relative to the central thickness in accordance with the third interferometric fringe pattern. The method can also be used for measuring thickness variations by taking into account a bow in the object. An interferometer is also provided for carrying out the method.

21 Claims, 3 Drawing Sheets

INTERFEROMETRIC THICKNESS VARIATION TEST METHOD FOR WINDOWS AND SILICON WAFERS USING A DIVERGING WAVEFRONT

FIELD OF THE INVENTION

The present invention relates to interferometers and methods of using interferometers to determine thickness and thickness variations in windows and silicon wafers. More specifically, the present invention relates to an interferometer and software program used in conjunction with the interferometer to determine thickness variations.

BACKGROUND OF THE INVENTION

In the field of silicon wafer production, the industry plans to start using 300 mm diameter wafers within the near future. The circuits that are etched onto such wafers will have sub-micron sizes. In order for these features to be properly imaged, the wafer must be flat within the depth of focus of the photolithography lens over the area of the image, typically 25 to 30 mm in diameter. The wafers are pulled down to a very flat chuck by vacuum. The front surface will be sufficiently flat only if the thickness variation of the wafer is no more than 0.1 or 0.2 µm over any 25 to 30 mm diameter area.

Present methods to determine thickness variations of wafers involve the use of differential capacitance gauges that are scanned over wafers of no more than 200 mm in diameter. It is doubtful that full 300 mm diameter wafers can be scanned with sufficient accuracy in a period of time that is economically attractive or practical.

A need therefore exists for and interferometric method and interferometer which provide both the speed and accuracy needed to make thickness variation measurements of today's new generation of 300 mm wafers cost effective.

A need also exists for a method and device to measure the homogeneity of a window if the flatness of the window surface is known.

SUMMARY OF THE INVENTION

The present invention overcomes the shortcomings of the prior art by providing an infrared interferometer and a non-contact method of using the device for determining a full aperture map of thickness variation and central thickness of silicon wafers and windows. According to the invention, the IR interferometer maps the thickness variation over the entire wafer surface in one rapid measurement, then provides a second measurement used to determine the central thickness of the wafer. If the wafer has substantial bow, a third measurement is taken with the wafer in a reversed position, thereby permitting determination of the bow and separation of its effect from the thickness variation measurement.

According to the present invention, a method is provided for rapidly and accurately measuring the thickness variations in silicon wafers used for the manufacture of integrated circuit chips and sensors. The method and apparatus of the invention can be used equally well for measuring variations in any window-like optic that has a high diameter to thickness ratio and near parallel polished surfaces. In particular, the method is useful for large, i.e., 300 mm wafers, the so-called "next generation" IC wafers.

The present invention requires the use of only one reference optic the size of a 300 mm wafer. The interferometer and software used in conjunction therewith can be used to measure thickness and homogeneity variations in other materials transparent to the light source as long as the surfaces have sufficient smoothness in figure and finish to produce interference fringes in transmission. Even silicon wafers with one side etched are sufficiently smooth to obtain useful thickness variation data when using an IR light source.

According to an embodiment of the invention, interferometric measurement of an entire 300 mm wafer can be made in as little as 1 second with better than 0.1 µm accuracy. Such a measurement can be made in a practical manner according to the invention by using a diverging wavefront and an infrared interferometer operating at a wavelength to which silicon is transparent, e.g., 1.55 µm. Because silicon is transparent to the wavelength, the transmitted wavefront can be measured. By assuming that the variation in index of refraction is essentially zero in a single crystal silicon, any transmitted wavefront distortion can then be attributed to thickness variation.

According to a first embodiment of the invention, an interferometer is provided. According to another embodiment, a method is provided which uses a software algorithm for interpreting data from the interferometer.

BRIEF DESCRIPTION OF THE DRAWINGS

The invention may be more fully understood with reference to the accompanying drawings, wherein.

DETAILED DESCRIPTION OF THE INVENTION

According to the present invention, an interferometer is provided which comprises three components: a light source; light beam dividing optics or some other form of a beamsplitter; and a detector. According to an embodiment of the present invention, the interferometric measuring system utilizes a light source which produces a wavelength to which silicon wafers are transparent, i.e., greater than 1.3 µm. A convenient light source of sufficient coherence length to obtain interference fringes is a laser diode operating at 1.55 µm. The source wavelength should be less than 2 µm if a fast response silicon vidicon camera is to be used as such cameras loose sensitivity much beyond 2 µm. The light is extracted from the laser diode via a pigtail lead that is terminated in a ferrule and polished at an angle to avoid feedback into the laser diode.

Figure 1:
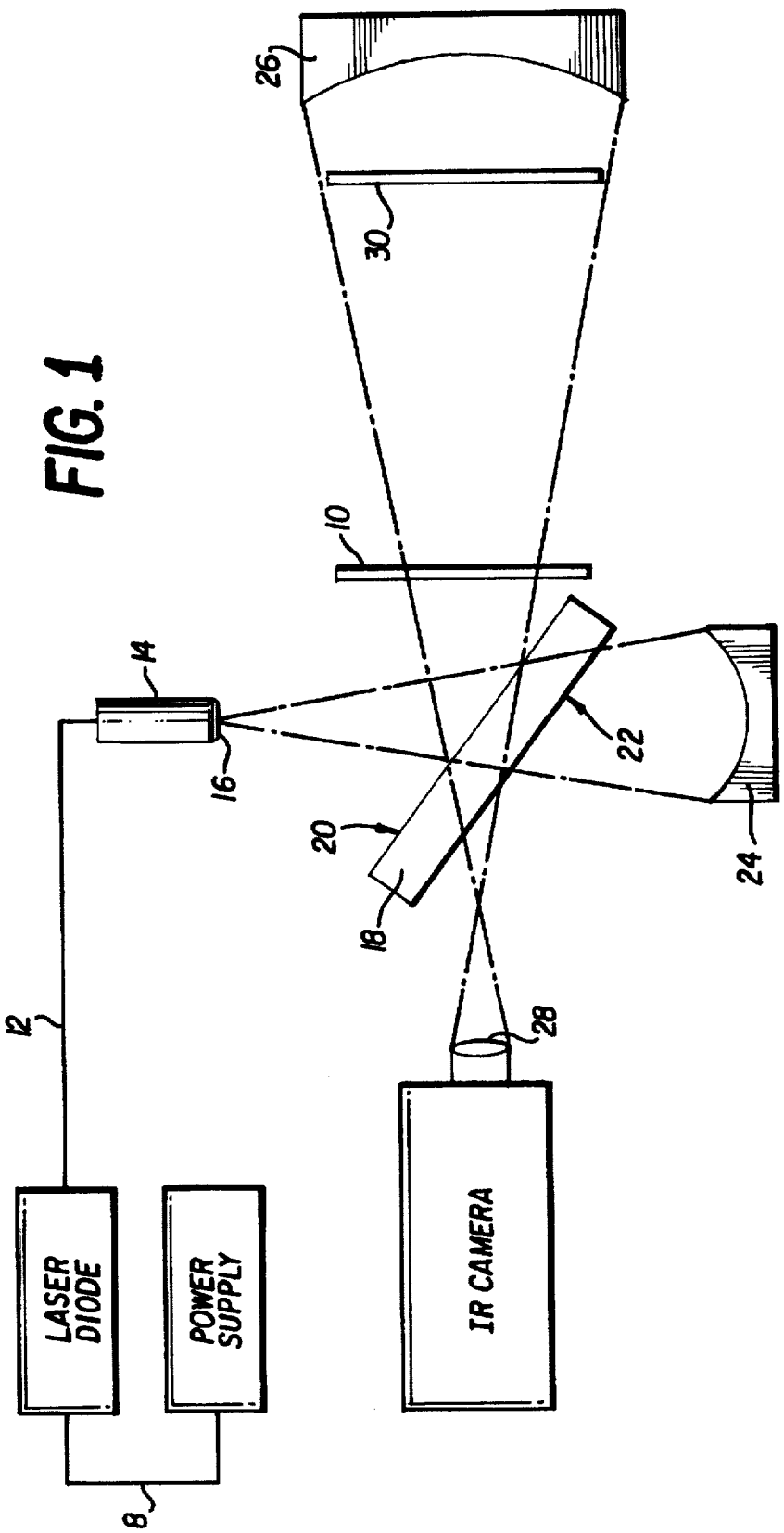
FIG. 1 is a representation of an interferometric system according to the present invention.

In the embodiment of the invention shown in FIG. 1, a distributed feedback (DFB) laser diode is used as the light source so that the frequency of the light is fixed. Less expensive cleaved cavity laser diodes do not lock into a single frequency but could be used according to the invention if coupled to an optical fiber that incorporates a grating for the purpose of locking the diode to a single frequency. If a cleaved cavity laser diode with a grating is not used, and a DFB laser diode is not used, the interferometric fringe pattern will continually drift across the aperture of the part being tested making data analysis difficult to impossible.

In the embodiment of FIG. 1, the DFB laser diode is connected to a power supply via a power cable 8. The laser diode is supplied with a factory installed single mode fiber optic pigtail lead 12. A ferrule 14 was subsequently cemented onto the end of the fiber and the ends of the two were polished at a 12° angle to prevent any of the light leaving the fiber from reflecting back into the laser diode and causing mode instability. The polished ends of the fiber and ferrule are collectively shown as reference numeral 16 in FIG. 1. Exemplary single mode fiber pigtailed DFB laser diodes operating at 1.55 µm can be obtained from Fujitsu or Melles Griot.

Light exits the single mode fiber at the polished end 16 in a spot about 6 µm in diameter and has a full field divergence of about 10 degrees. The ferrule is about 2.5 mm in diameter and about 25 mm long. Ferrules of such dimensions are preferred in that they make handling the fiber end convenient since such ferrules fit easily into a plug in a commercial mirror mount.

The frequency or wavelength at which the diode lases is very dependent upon the temperature of the laser diode, and the temperature is in turn a function of the current at which the diode is operated. As long as the current is fixed, the diode soon comes into equilibrium with its environment and the lasing mode is quite stable. If, on the other hand, it is desired to change the wavelength in order to purposefully shift the interference fringes to do phase stepping interferometry, for example, this may be done by modulating the current driving the laser diode. An input for externally modulating the laser diode current is provided on the diode power supply.

Results achieved using the interferometer design of FIG. 1 and the method described herein with respect to that configuration indicate that the DFB laser diode has plenty of intensity, is more than coherent enough for large differences in the arm lengths of the interferometer, and is quite stable. Most of the light coming from the single mode fiber optic pigtail is contained in an f/8, or so, cone. If it is desired to operate the interferometer at a faster F/#, auxiliary optics can be used to expand the cone of light. As single mode fibers with longitudinal gratings become more widely available, pigtailed, cleaved crystal laser diodes may be a less expensive way to make a sufficiently coherent source. For ease of alignment, it is preferred to have a visible light source and fiber feed integrated with the IR source. These do not have to be in the same fiber and if two fibers are used they could be immediately adjacent one another.

Although a 1.55 µm laser diode was used in the exemplary embodiment described with respect to FIG. 1, any laser diode which emits a wavelength in the range of from 1.2 µm to 2.0 µm could be used as the light source. This range represents the lower end of the transmission window of silicon and the upper end of the sensitivity of the silicon ridicon camera. By changing the detector, a 10.6 µm $CO_2$ laser could instead be used with a pyroelectric ridicon to decrease the sensitivity of the device and make it useful for measuring the thickness variations in germanium, for example. The basic idea will work with any laser source of sufficient coherence and camera that is sensitive in the same spectral window as the transmission window of the material under consideration.

Light exiting the laser diode is directed toward a beamsplitter 18 as shown in FIG. 1. The beamsplitter divides the light from the source so that approximately half goes toward the object to be tested and half goes toward a reference surface. Although a cube beamsplitter can be used, it is not preferred because of the ghost reflections it causes, even when supplied with an antireflective coating. Instead, it is preferable to use a plate beamsplitter (18) at a 45° angle having a 50/50 beamsplitter coating 20 on the front surface thereof. The rear surface is preferably provided with an antireflective coating 22 that is tuned to 1.55 µm.

According to a preferred embodiment, the beamsplitter is a plane parallel plate with silicon used for the 50% reflective coating and silicon/silicon oxide used for the antireflective coating. Silicon affects the polarization splitting much less than a metal coating and is almost transparent in the visible so the interferometer is easy to align in the visible. The beamsplitter plate must be parallel to within a few seconds to avoid introducing astigmatism in the interferometer. This is of particular importance if the interferometer is not used in a phase stepping mode for data recovery.

Because the laser diode 14 is effectively a point source and the test arm of the interferometer is terminated with a concave spherical mirror 26, a concave spherical mirror 24 was likewise used for the reference surface. The configuration thus provided is what is commonly referred to as a "Williams" interferometer configuration. In the exemplary embodiment shown in FIG. 1, the concave reference mirror 24 has a convenient aperture and a radius of curvature of about 100 mm, although any convenient aperture and radius can be used. The radius of curvature is preferably chosen to be exactly the same length as the length from the angle polished end of the fiber to the concave surface of the reference mirror 24. The aperture of the test mirror 26 was 150 mm in the exemplary embodiment shown in FIG. 1 and the radius of curvature of the test mirror was 3030 mm. The radius of curvature of test mirror 26 should equal the sum of the lengths from the mirror surface to the beamsplitter front surface 20 and from the beamsplitter front surface to the terminal polished end 16 of the fiber.

The spacings in the interferometer are arranged so that the point source is at the centers of curvature of the two spheres as viewed in the beamsplitter. The two spheres are tilted just enough so that none of the light from the point source is directed back onto the fiber ferrule as such light can upset the laser mode pattern and ruin the coherence if reflected laser light is allowed to reach the diode. The spheres are also tilted relative to each other so their centers of curvature are made common in the beamsplitter and the cones of light from the two spheres are coincident when they overlap, giving the desired interference of the two wavefronts.

The third major component or portion of the interferometer is the detector. According to an embodiment of the present invention, a silicon ridicon infrared camera is used that is sensitive to light in the 0.8 to 2.2 µm wavelength region. The camera is most sensitive to wavelengths just beyond 0.8 µm and gradually loses sensitivity to wavelengths approaching 2.2 µm. Exemplary IR ridicons suitable for use in the present interferometer and method are available from Hamamatsu or ElectroPhysics Corp. On the front of the camera, an objective lens 28 is provided that focuses on the spherical mirror 26 in the test arm of the interferometer. The mutual centers of curvature are made to lie about in the middle of the objective lens. A "V" notch filter is preferably used on the lens to exclude all but the 1.55 µm radiation from the camera.

The ElectroPhysics Corp. silicon ridicon was well suited as the detector. It produced a high contrast output, and because of the automatic gain control or very non-linear response to intensity, it was possible to get high contrast fringes even when there was substantial variation in the intensities in the two interfering light beams. The ridicon output is well suited for use as an input to commercially available WYKO Wisp software for fringe reduction and would also be suitable for phase stepping reduction if the diode source is modulated. Alternatively, phase stepping may be achieved by mounting either mirror 24 or mirror 26 on an appropriate driver, for example, a piezoelectric translation system.

Each of the source, beamsplitter and detector components of the interferometer are firmly attached to a plate that can be adjusted in three degrees of translation to line up with the center of curvature of the test arm spherical mirror. Once interference fringes are obtained between the interferometer and the test arm sphere, and the position of the interferometer is adjusted until there are only a couple of fringes in the field of view, a silicon wafer is inserted in the test beam as close as possible to the beamsplitter. This initial position of the wafer is shown as reference numeral 10 in FIG. 1. The angular alignment of the wafer to the test beam is not critical and the test is completely non-contacting. If the optional auxiliary optics referred to above are used, there may be a real focus within the test arm; in this case, the initial position would straddle that focus.

Because of the added optical path due to the silicon, the fringes observed with the interferometer will show focus error, or be curved. In the first position 10 of the wafer, a nominal 10 mm diameter area in the center of the wafer is examined and the test mirror is moved axially until the interferometer shows zero focus or power error. The test mirror 26 in the test arm is then moved back until the fringes are again straight. The movement of the mirror gives the average thickness of the wafer over the central portion where the IR beam is going through the wafer. The wafer thickness, t, is equal to d/2(n−1), where d is the test arm mirror movement and n is the index of refraction of silicon, about 3.48 at the test wavelength of 1.55 μm. When the wafer is moved adjacent the spherical test mirror, any wavefront distortion including power can be assumed due to thickness variations in the wafer. The reference mirror is always held constant.

By moving the return mirror back by d, the fringes again become straight indicating no focus error. The wafer is then moved until it is just in front of the return spherical mirror 26, at a location 30, and the cone of light in the test arm of the interferometer fills the whole wafer. The fringe pattern now seen represents the thickness variation in the wafer using the center of the wafer as the reference or zero level contour. Since the optical path difference is equal to 2(n−1)*Δt where Δt is the physical thickness change, each interference fringe represents a 0.305 μm change in thickness.

The foregoing configuration is preferred according to an embodiment of the present invention because the implementation of a diverging wavefront uses only one optic the size of the window or wafer under test. Because the optics tend to increase in cost as the cube of the diameter, the cost savings for testing large windows and wafers can be significant.

Software for use with the interferometer is also provided according to the present invention. The software of the invention starts with a measurement of the central wafer thickness. The return mirror in , e.g., the interferometer shown in FIG. 1, is first positioned longitudinally so that the interference fringes are straight or there is no focus error. The wafer is then inserted as close to the interferometer focus as possible. This will add power to the fringes and by moving the return mirror away from the interferometer an amount equal to s(n−1)t, the fringes will become straight again. Assuming a phase shifting or stepping implementation of the interferometer, it will have a resolution of at least λ/100 or 0.016 μm using an f/4 nominal design. This permits measurement of wafer absolute mechanical thickness to ±0.4 μm without making physical contact, and the accuracy is limited by the f/# of the test cone of light. As is well known, the f/# is the ratio of the aperture of the mirror to its radius of curvature. For example, an f/4 optic has a radius of curvature which is four times larger than the aperture of the optic.

With this done, the center thickness becomes the reference or zero level for the thickness variation measurement. The wafer is then moved longitudinally up in front of the return spherical mirror and a second interferogram is taken. If the wafer is nominally flat (free of bow), then this interferogram represents the thickness variation where each fringe represents 0.305 μm change in thickness. This data is captured in one measurement with a spatial density of about 250×250 pixels, the resolution of the ridicon detector.

If the wafer has substantial bow, the bow will effect the accuracy with which the thickness variation can be measured. According to another embodiment of the invention, a method is provided for removing the effect of the bow by making a third measurement. A third interferogram is taken after the wafer has been rotated or flipped 180° about any axis thereof in the plane of the wafer. Thus, if the concave side of the bow faced the interferometer in the previous interferogram, it will now face away from the interferometer. The third interferogram is taken and the contour data from this interferogram are rotated 180° about the vertical axis and added to the contour data from the second interferogram and divided by 2. The resultant average of the two interferograms represents the thickness variations of the wafer independent of any bow in the wafer.

It should be recognized that many other interferometer configurations can be used, such as Twyman-Green, Fizeau, Michelson and Mach Zehnder in collimated or diverging wavefront adaptations, and can provide equally good technical performance. Shearing and common path implementations are also possible for use according to the present invention. The particular advantage of the Williams and Twyman-Green configurations is that only one large optic is needed in the interferometer cavity, which can also be said of the Shearing and common path implementation configurations.

To read out the interferometer, either a static device could be used where a single fringe pattern is recorded and reduced off-line, or it can be a phase measuring device where the data are immediately available from the interferometer. A phase stepping or shifting implementation is preferred because the data is available much more quickly and any errors in the interferometer cavity are easily subtracted out as common mode error with the phase measuring interferometer. The most straight forward method of phase shifting or stepping the laser diode is modulating the current source to the diode, but the interferometer could also be phase shifted in any one of many other ways already applied to visible light interferometers.

A major commercial application for the device is in the process control of grinding and polishing silicon wafers. Thickness variation control is essential for getting maximum performance out of wafer steppers, particularly for the next generation of 300 mm wafers and the smaller feature sizes associated with such large wafers.

EXAMPLES

Figure 2:
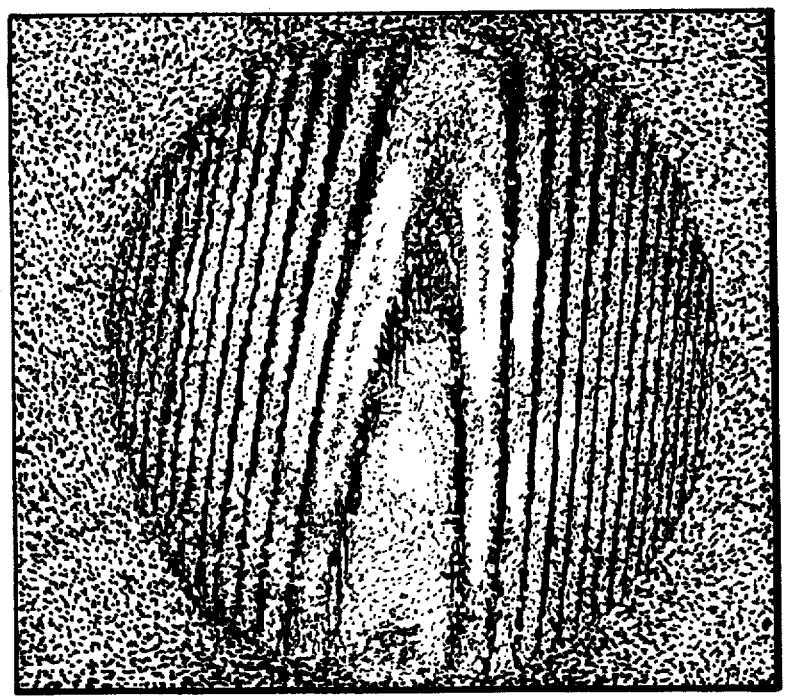
FIG. 2 is an interferogram showing the fringe pattern in a bare interferometer cavity according to the present invention.
Figure 3:
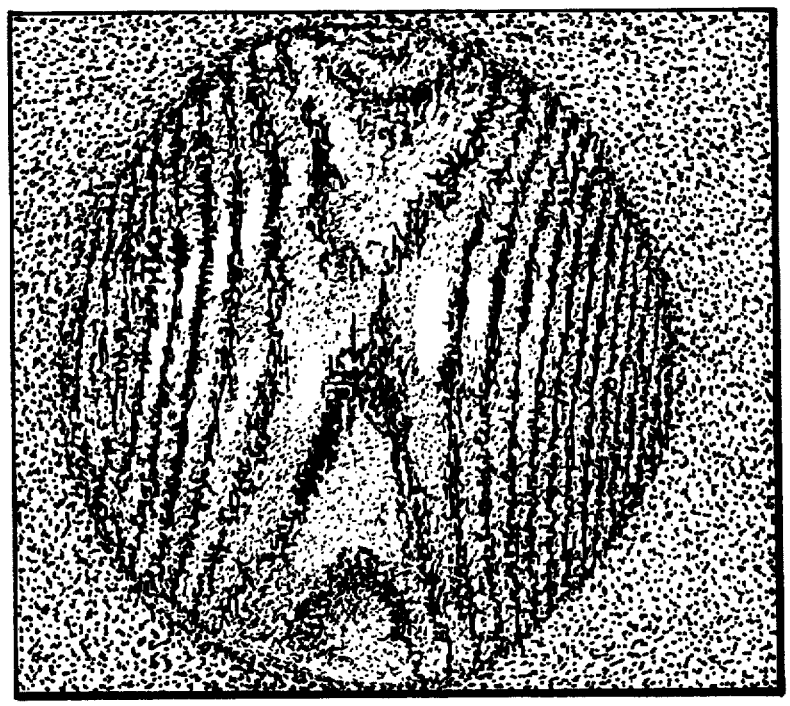
FIG. 3 is an interferogram showing the fringe pattern of a 100 mm diameter Puresil silicon wafer in the interferometer cavity used for the interferogram of FIG. 2.

An interferometric method as discussed above, was carried out using an interferometer as shown in FIG. 1. Actual measurements were taken on a variety of wafers, including some 4 inch silicon wafers available from Puresil. These 4 inch wafers were polished on both sides and parallel to within about 2 μm. FIG. 2 is an interferogram showing what the fringes in the interferometer cavity first looked like with no wafer in the cavity. FIG. 3 is an interferogram showing what the fringes looked like after a wafer had been inserted into the cavity. Notice that while the fringes change shape, there is no noticeable change in contrast or intensity of the fringes.

Figure 4:
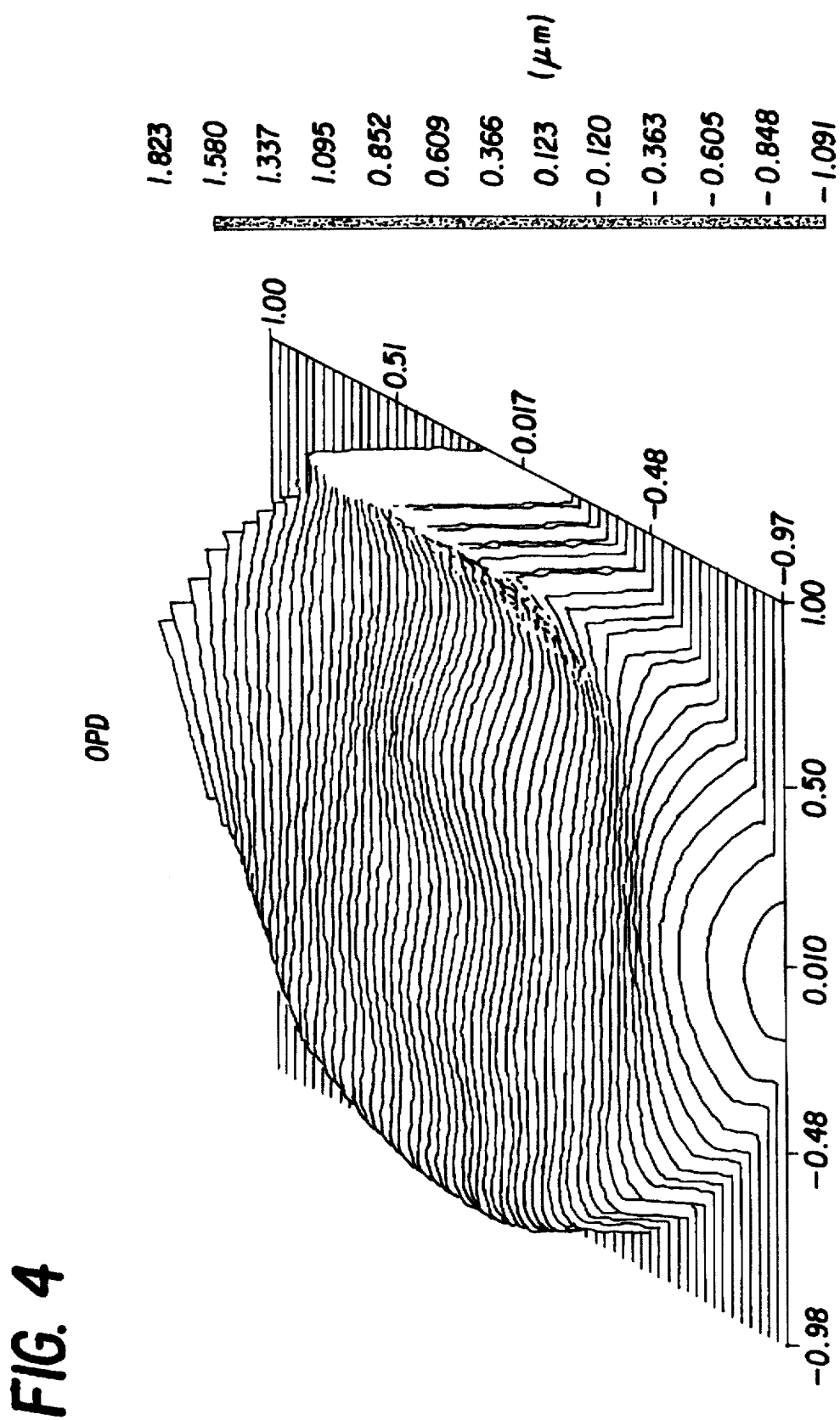
FIG. 4 is a map of thickness variations of the interferometer cavity measured as the difference between the thickness measurements of the cavity with the Puresil wafer in the cavity and out of the cavity.

FIG. 4 is a contour map showing thickness variation of the same 4 inch Puresil wafer. Thickness variation was calculated as the contour of the cavity with the wafer therein minus the contour of the bare cavity. The conversion equations discussed above were used for converting optical path differences into thickness variation measurements.

A 1.550 μm wavelength beam was used in a double pass over the interferometer cavity. Commercially available WYKO software was used to generate the map from the fringe patterns. The waves per fringe ratio was set to 0.50 to achieve the change in physical dimension relative to the optical path difference. The pupil was set to 100%.

The optical path difference was determined by comparing the interferometer cavity thickness with the wafer therein, to the cavity thickness without the wafer. The difference was 2.914 μm.

To determine the peak-to-valley thickness variation, the OPD was then substituted into the equation $\Delta t=(OPD)/(n-1)$, wherein OPD is the optical path difference and n is the index of refraction of silicon at a wavelength of 1.550 μm. Using an index value of 3.5 at 1.550 μm, and the OPD of 2.914 μm, a value of 2.914 μm/2.5, or 1.17 μm, is derived. Thus, the wafer had a peak-to-valley thickness variation of 1.17 μm over a measurement diameter of 80 mm. The root mean square of deviations from the best fit plane through the data was 229 nm.

In a related experiment, the results shown below were modeled using the lens design code ZEMAX SE. It was assumed the center thickness of the wafer was 0.5 mm, the test wavelength was 1.55 μm and the index of refraction of silicon at that wavelength is 3.482, a number derived from the ZEMAX glass catalog. The f/# of the test cone was 3.5, matching the test optics. The radius of the test sphere was exactly 1100 mm. In order to simulate the thickness variation in the wafer, the surface nearest the interferometer was given a Zernike polynomial representation shown in Table 1.

TABLE 1

| Zernike Coefficients of the Surface Error on the Wafer | |
|---|---|
| $a_0^0 =$ | 0 λ at 1.5 μm |
| $a_1^1 =$ | 0 |
| $a_1^{-1} =$ | 0 |
| $a_2^2 =$ | 0.01 |
| $a_2^0 =$ | 0.2 |
| $a_2^{-2} =$ | 0.03 |
| $a_3^3 =$ | 0 |
| $a_3^1 =$ | −0.035 |

TABLE 1-continued

| Zernike Coefficients of the Surface Error on the Wafer | |
|---|---|
| $a_3^{-1} =$ | 0.018 |
| $a_3^{-3} =$ | 0 |
| $a_4^0 =$ | 0.1 |

The procedure for doing the test is to first position the test sphere in tip, tilt and focus so that there is a null or broken out fringe on the monitor. With the 1100 mm radius of the sphere, the spacing from interferometer diverger focus to the sphere should be exactly 1100 mm. The wavefront due just to the sphere is measured and stored for reference.

The wafer is then inserted in the beam 35 mm outside of focus. With the f/3.5 beam, a 10 mm diameter patch in the center of the wafer is illuminated. Because the wafer has an index different than air, the wafer has the effect of lengthening the optical path by $[(n-1)/n]*t$ or 0.356 mm, in this case. The sphere must be moved back by this amount in order to again have zero focus error, an amount confirmed by ZEMAX to 1 μm. If the wafer were any other thickness, adjusting the sphere for zero focus still has the effect of correctly positioning the sphere to compensate for the center thickness of the wafer.

ZEMAX further confirms that all other Zernike terms are smaller than 0.001 λ except $a_4^0$ which is −0.0015, an amount expected due to placing a plane parallel plate in a diverging beam of this f/#.

Without touching the test sphere, the wafer is moved toward the sphere until the edge of the 300 mm diameter wafer just coincides with the cone of the diverging f/3.5 light beam. This happens when the wafer is approximately 50 mm from the sphere. The Zernike coefficients for the transmitted wavefront for this case are given in Table 2 along with the expected coefficients based on the first order calculation of OPD:

$$OPD=2*(n-1)*\Delta t.$$

The 2 is used because it is a double pass test, (n−1) is the effect of the index, and Δt is the thickness variation due to the Zernike surface error.

TABLE 2

| Zernike Transmitted Wavefront Error and First Order Estimate | | |
|---|---|---|
| | Determined by ZEMAX (λ at 1.5 μm) | First Order Estimate (λ at 1.5 μm) |
| $a_2^2 =$ | 0.050 | 0.050 |
| $a_2^0 =$ | 0.996 | 0.993 |
| $a_2^{-2} =$ | 0.149 | 0.149 |
| $a_3^3 =$ | 0 | 0 |
| $a_3^1 =$ | −0.173 | −0.174 |
| $a_3^{-1} =$ | 0.089 | 0.089 |
| $a_3^{-3} =$ | 0 | 0 |
| $a_4^0 =$ | 0.496 | 0.496 |

Thus, for the case where the wafer is assumed to be nominally flat, the wavefront errors are calculated by ZEMAX are within 3 nm of the expected values of a first order calculation.

In yet another example, a wafer having bow was tested. Unmounted wafers typically have substantial bow. The test was conducted to ensure that the bow does not affect the power ($a_2^0$) determination.

To study the effect of bow, a perfect wafer having no Zernike errors was deformed to put enough of a radius on both surfaces to provide a 0.5 mm bow, or a focus term coefficient of $a_2^0 = 250 \lambda$. This bow is equivalent to a 22.5 m radius in the same direction on both sides of the wafer so the thickness remains constant. A simulated measurement of the bowed wafer was conducted in the same way as with the wafer having the Zernike error. First, the wafer is measured close to focus to set the test sphere axial distance, and then the wafer is moved toward the sphere until the full f/3.5 cone filled the wafer.

When the wafer was inserted with the concave side toward the focus, the bow introduced −0.204 λ of power. When the convex surface faced the focus, it introduced 0.230 λ of power. The reversal of the sign of the power is used to separate power introduced by a thickness change from power introduced due to bowing. The effect of bowing on the power coefficient is about 1 part in 1000 of the actual bowing of the wafer surfaces.

If the Zernike error surface in Table 1 is applied to the wafer in addition to the bowing, the Zernike coefficients shown in Table 3 are derived. In Table 3 below, the left hand column shows coefficients for the measurement taken with the concave side facing the focus. The right hand column shows coefficients for the measurement taken with the convex side facing the focus. It is easy to see that the focus error due to bowing is added algebraically to the Zernike surface error with an accuracy in the couple of nm level. Otherwise, the coefficients are unaffected by the bow except for a few nm in the case of $a_4^0$.

TABLE 3

Zernike Transmitted Wavefront Error of a Bowed Wafer

| | Concave toward focus | Convex toward focus |
|---|---|---|
| $a_2^2 =$ | 0.050 | 0.050 |
| $a_2^0 =$ | 0.794 | 1.224 |
| $a_2^{-2} =$ | 0.149 | −.149 |
| $a_3^3 =$ | 0 | 0 |
| $a_3^1 =$ | −.173 | 0.173 |
| $a_3^{-1} =$ | 0.089 | 0.089 |
| $a_3^{-3} =$ | 0 | 0 |
| $a_4^0 =$ | 0.498 | 0.495 |

In the foregoing model, a symmetric bow was used which perhaps had a smaller bow than may be expected in a full 300 mm diameter wafer. However, the effect of the bow on the full diameter of the wafer was calculated rather than the 25 to 30 mm die site. Since it is flatness over this size region that is required to the 10's of nm level, the ability to discern thickness variation over the entire wafer to better than 1 micrometer implies knowing flatness over a 30 mm region to 10 nm. Thus, even without pushing this modeling technique to account for all modes of bowing, flatness over 30 mm regions can be determined to within an accuracy of 10 nm or better.

Determining bow was the subject of yet another example of the present invention. Free standing silicon wafers tend to have "bow" due to an imbalance in residual stresses and due to a polishing process which removes more material at the edge of the wafer than in the center. The bow tends to be convex when viewed from the polished side. If the bow is sufficiently severe, the wafer may not sit down completely on a vacuum chuck or may break when pulled down. Thus, it is of interest to be able to measure bow but to nowhere near the accuracy needed for the thickness variation.

When a wafer becomes bowed due to processing and polishing, the bow tends to be largely spherical so the wafer is shaped like a very weak meniscus lens. The wafer will usually also have other forms of distortion such as astigmatism or 3-corner hat but to a lesser degree than the pure bow. If such shapes are considered in terms of Zernike polynomials, the shape of the free standing wafer can then be described in Zernike terms since the thickness variation will be on the order of 1000 times less than the magnitude of the bow. Even if the thickness variation were bigger, it would still be possible to think of the shape of the neutral plane of the wafer in Zernike terms.

Solving for the shape of the bow involves using the same measurement data used to determine the thickness variation. If the coefficients for the 2 tests where the wafer is close to the sphere are subtracted rather than added (or vice versa depending on the symmetry of the term) and divided by 2, a number proportional to the bow in the shape of that Zernike term is obtained. For example, in Table 3 if the difference between the coefficients is used for $a_2^0$ instead of the sum between them, the result would be a number proportional to the change in the wavefront due to the bow. Similar calculations could be made with the other coefficients.

It is easy to see that this subtraction is not too sensitive because two large numbers will be subtracted from each other in general, rather than added as in the case of finding the thickness variation. That is why the bow cannot be found with anywhere near the precision of the thickness variation, however, it is not necessary to know the bow that well.

It turns out that for higher order bowing, the difference after subtracting coefficients will contain terms not only of the type of the bow, but also of lower order coefficients of the same symmetry, as well as in specific proportions. In addition, the difference coefficients show a specific change in sensitivity to the bow of that order as a function of the radial order of the coefficients. Thus, any particular shape of bow can be found from the difference coefficients and only one calibration factor is needed for the specific geometry of the test set up. Once the nominal wafer thickness, f/# of the test light cone, and wavelength of the light source are known, the calibration factor to convert the wavefront information into topography of the wafer neutral plane remains the same for all wafers tested with that geometry.

The data derived from the interferograms, calculated OPD and thickness variations can be input to any number of commercially available software programs, e.g. WYKO WISP software, to derive data sets which identify many parameters of the wafer tested. Typically, these software programs can be run on any number of computers including IBM compatible personal computers. Such software is commonly used to derive Seidel aberrations, fit errors, the location of analysis aperture in the data array, and Zernike polynomial coefficients. For example, polynomial fits for 2 terms, 3 terms, 8 terms, 15 terms, 24 terms and 36 terms are typically determined by the use of such software. For the location of analysis aperture in the data array, such software is used to determine the x center, y center, radius and aspect parameters.

In another example, commercially available six inch wafers were also measured. The six inch wafers were etched on one side and polished on the other side. The wafers showed rather rough fringes due to the etching but they were of high contrast and could easily be reduced using phase shifting methods. It was also immediately obvious that (1) these six inch wafers were not very well controlled for thickness variation, and (2) the present interferometric method is very sensitive to thickness variation. There were dozens of fringes of variation from center to edge of the six inch wafers. Most of that variation was in the first 6 to 8 mm of the edge, but even the centers of the wafers showed 10 or more fringes of variation. Thicker wafers that were ground on both sides scattered too much light to get useful fringes.

In yet another example, highly doped, low resistivity silicon wafers polished on both sides were also studied. Such wafers were fairly opaque in double pass transmission but still had visible fringes. Thus, it is expected that thickness variations could be measured in epitaxially grown silicon layers as well as in bulk silicon. Doped silicon may be more transparent to wavelengths other than 1.55 µm; finding a more optimal wavelength would increase the accuracy of the interferometric results.

Although the present invention has been described in connection with preferred embodiments, it will be appreciated by those skilled in the art that additions, modifications, substitutions and deletions not specifically described may be made without departing from the spirit and scope of the invention defined in the appended claims.

What is claimed is:

1. A method of detecting variations in the thickness of an object, said method comprising the steps of:

(A) providing an object to be measured which is transparent to a wavelength of electromagnetic radiation;

(B) providing a radiation source which emits a beam of electromagnetic radiation at said wavelength, said beam having a diverging wavefront;

(C) splitting said beam into a reference beam and a test beam;

(D) positioning said object in a first position in said test beam at which the test beam irradiates a first central portion of said object;

(E) directing said test beam through said first central portion of said object;

(F) causing said reference beam to interfere with said test beam which has passed through said first central portion to form a first interferometric fringe pattern; then (G) changing the length of the test beam which has passed through said object until said first interferometric pattern is changed into a desired second interferometric fringe pattern;

(H) determining a central thickness of said object in accordance with an amount by which the length of the test beam was changed in step (G);

(I) moving said object in said test beam to a second position in said test beam where said test beam irradiates a second portion of said object which is larger than said first central portion thereof; then (J) causing said reference beam to interfere with said test beam which has passed through said second portion to form a third interferometric fringe pattern; and (K) determining thickness variations relative to said central thickness by detecting the third interferometric fringe pattern and calculating the thickness variations in accordance with said detected third interferometric fringe pattern.

2. A method according to claim 1, wherein said object has a first surface and an opposite second surface, and in step (E) said test beam is directed at said first surface, said method further comprising the steps of:

(L) reversing said object within said test beam such that said test beam is directed at said second opposite surface; then (M) positioning said object in said test beam to said second position; then (N) causing said reference beam to interfere with said test beam which has passed through said second portion from said second opposite side to form a fourth interferometric fringe pattern; then (O) determining an average of said third and fourth interferometric fringe patterns, wherein said step (K) comprises determining said thickness variations in accordance with said average.

3. A method according to claim 1, wherein said second portion is the entire object.

4. A method according to claim 1, wherein said wavelength is between 1.2 µm and 2 µm.

5. A method according to claim 1, wherein said wavelength is about 1.55 µm.

6. A method according to claim 1, wherein said object has a diameter, said test beam reflects off of a return mirror, and an aperture of said return mirror is larger than the diameter of said object.

7. A method according to claim 1, wherein steps (H) and (K) are implemented under the control of a computing device which executes software to perform steps (H) and (K) automatically.

8. A method according to claim 1, wherein said steps (F) and (J) include filtering out radiation from said reference beam and said test beam which is of any frequency other than a frequency corresponding to said wavelength.

9. A method according to claim 1, wherein step (F) includes reflecting said test beam off of a concave spherical return mirror, and step (G) includes moving said return mirror.

10. An interferometer for detecting variations in the thickness of an object, said interferometer comprising:

(A) a radiation source which emits a beam of electromagnetic radiation at a wavelength to which an object to be measured is transparent, said beam having a diverging wavefront;

(B) means for splitting said beam into a reference beam and a test beam;

(C) means for positioning the object in a first position in said test beam at which the test beam irradiates a first central portion of the object;

(D) means for directing said test beam through the first central portion of said object;

(E) means for causing said reference beam to interfere with said test beam which has passed through the first central portion to form a first interferometric fringe pattern;

(F) means for changing the length of the test beam until said first interferometric pattern is changed into a desired second interferometric fringe pattern;

(G) means for determining a central thickness of the object in accordance with an amount by which the length of the test beam was changed by the means of component (F);

(H) means for moving the object in said test beam to a second position in said test beam where said test beam irradiates a second portion of the object which is larger than the first central portion thereof;

(I) means for causing said reference beam to interfere with said test beam which has passed through the second portion to form a third interferometric fringe pattern; and (J) means for determining variations relative to the central thickness in accordance with the third interferometric fringe pattern.

11. An interferometer as in claim 10, wherein said object has a first surface and an opposite second surface, and said means for directing said test beam directs light at the first surface, said interferometer further comprising:

(K) means for reversing the position of the object so that said means for directing directs the test beam at the second opposite surface of the object.

12. An interferometer as in claim 11, further including:

(L) means for positioning the object in said test beam in the second position after the position of the object has been reversed by said means for reversing;

(M) means for causing said reference beam to interfere with said test beam which has passed through the second portion from said second opposite side to form a fourth interferometric fringe pattern; and (N) means for determining an average of said third and fourth interferometric fringe patterns, wherein said component (J) comprises means for determining said thickness variations in accordance with said average.

13. An interferometer as in claim 11, wherein said radiation source comprises a distributed feedback laser diode.

14. An interferometer as in claim 11, wherein said radiation source emits radiation at a wavelength between 1.2 μm and 2.0 μm.

15. An interferometer as in claim 11, wherein said radiation source emits radiation at a wavelength of about 1.55 μm.

16. An interferometer as in claim 11, wherein the object has a diameter, said component (E) includes a return mirror, and an aperture of said return mirror is larger than the diameter of the object.

17. An interferometer as in claim 11, wherein components (G) and (J) comprise a computing device which executes software to determine central thickness and variations thereto.

18. An interferometer as in claim 12, wherein components (G), (J) and (N) comprise a computing device which executes software to determine central thickness and variations thereto.

19. An interferometer as in claim 11, wherein component (B) comprises a plate beamsplitter having a beamsplitter coating on a front surface thereof and an antireflective coating on a back surface thereof.

20. An interferometer as in claim 19, wherein the beamsplitter coating comprises silicon, and wherein the antireflective coating comprises layers of silicon and silicon dioxide.

21. An interferometer as in claim 11, wherein components (E) and (I) comprise a silicon ridicon infrared-detecting camera.

* * * * *